(No Model.)

V. P. TRAVERS.
Clasp for Adjusting Hammocks, &c.

No. 240,866. Patented May 3, 1881.

Witnesses.
John C. Tunbridge
Henry F. Parker

Inventor.
Vincent P. Travers
by his attorney
A. v. Briesen

United States Patent Office.

VINCENT P. TRAVERS, OF NEW YORK, N. Y.

CLASP FOR ADJUSTING HAMMOCKS, &c.

SPECIFICATION forming part of Letters Patent No. 240,866, dated May 3, 1881.

Application filed February 26, 1881. (No model.)

*To all whom it may concern:*

Be it known that I, VINCENT P. TRAVERS, of New York, in the county and State of New York, have invented an Improved Clasp for Adjusting Hammocks and other Articles Suspended from Ropes, of which the following is a specification.

Figure 1:
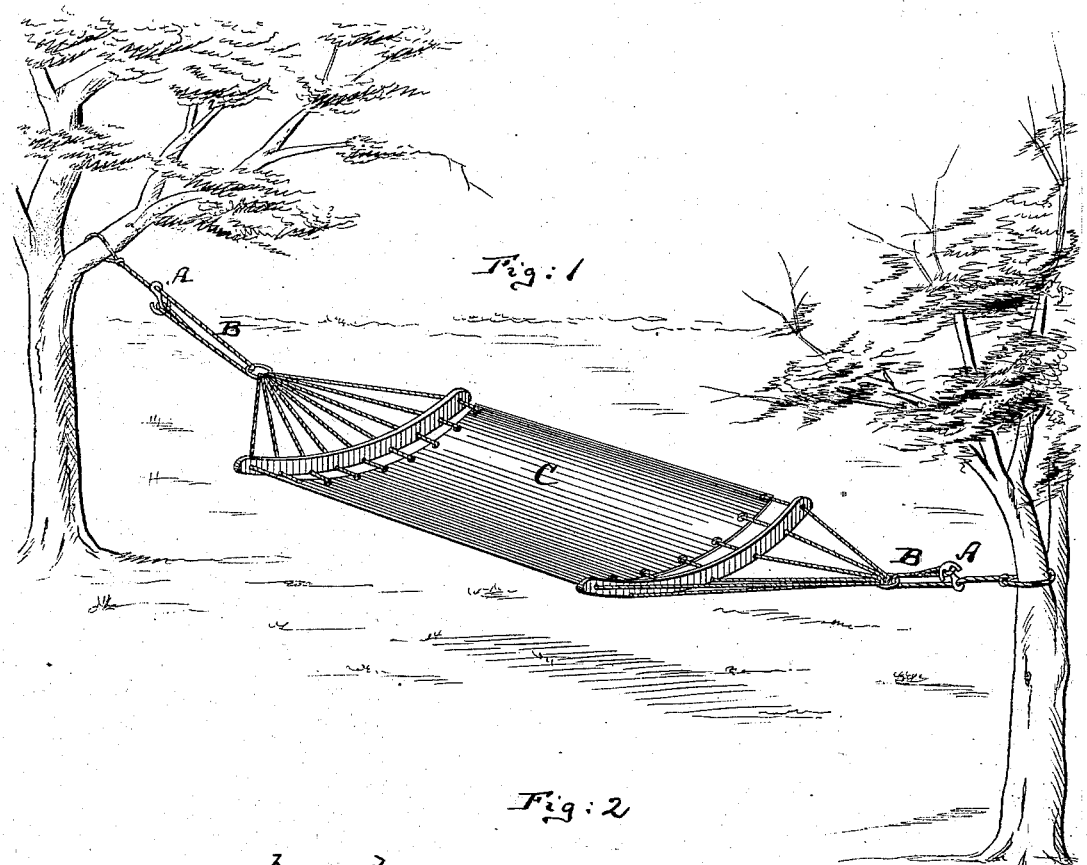
Figure 2:
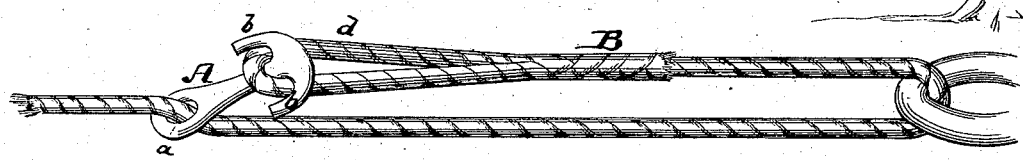
Figure 3:
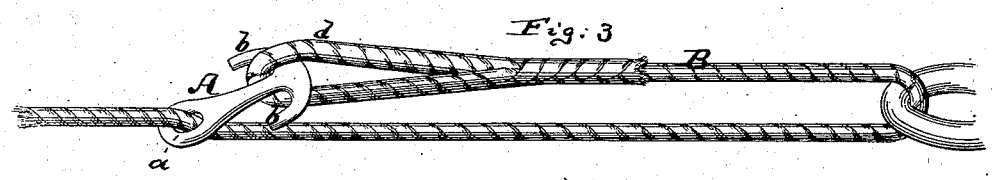
Figure 4:
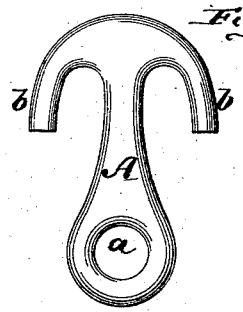

Figure 1 is a perspective view of a hammock suspended with the assistance of my improved clasp. Figs. 2, 3, and 4 are side views of the clasp.

This invention relates to a new attachment for the suspension-ropes of hammocks and the like. The attachment is a metal clasp, which has an eye or hole at one end and a hook or pair of hooks at the other end, and is intended to operate as a friction-clasp and slide on the rope that is passed through the eye and caught in the hook thereof.

In Figs. 2, 3, and 4, the letter A represents my improved clasp. *a* is the eye at one end thereof, and *b b* are the hooks at the other end thereof. The rope B, having a loop, *d*, at its end, is drawn through the eye *a*, and the hook or hooks *b* are then put through the loop *d*, as clearly shown in Figs. 2 and 3. Upon strain being applied to the rope the loop end of the clasp A bites on the rope, as shown by the bend in the rope where it passes through the eye *a* in Figs. 2 and 3, and the clasp thus forms a friction holder or button, which will permit the rope to be made longer or shorter without any difficulty and hold it securely in the length to which it has been adjusted.

The invention is particularly advantageous for use on hammocks, as shown in Fig. 1, where the letter C represents a hammock, and B B are the ropes by which it is suspended from suitable trees or other supports. Here the ropes are fastened to the trees and passed through eyes at the ends of the hammock, and then secured to the clasps A, as shown.

If the hammock is to be adjusted farther up or down, it is very easy to slide the end of each clasp A that has the eye *a* upon the rope that passes through the eye, and yet as soon as weight is placed into the hammock the eye portion of the clasp will bite on the rope and insure positive safety in sustaining the hammock.

The invention is equally applicable to fastening other things than hammocks, and may be applied, instead of looping the rope through the eye of the hammock, to adjust the rope that is placed around the tree or post.

The attachment or clasp A is made of suitable metal, of suitable size, and preferably with the two hooks *b b*, so that it can be used in the manner shown in Fig. 2; but it will be effective, though not quite so good, if it is used in the manner shown in Fig. 3.

I claim—

1. The rope-clasp A, having the eye *a* at one end and the hook *b* at the other end, in combination with the rope that is passed loosely through said eye and fastened to hook *b*, and with the weight C, which is suspended from said rope, causing it to bind in the eye *a*, substantially as described.

2. As a new article of manufacture, the rope-clasp A, made with the eye *a* at one end and the hooks *b b* at the other end, both placed in the same plane with the eye, substantially as herein shown and described.

VINCENT P. TRAVERS.

Witnesses:
SAML. R. BETTS,
HARRY M. TURK.